United States Patent
Noguchi et al.

(10) Patent No.: US 7,255,207 B2
(45) Date of Patent: Aug. 14, 2007

(54) PISTON SEAL AND DISC BRAKE USING THE PISTON SEAL

(75) Inventors: Toru Noguchi, Ueda (JP); Kazuhito Kawata, Ueda (JP); Takashi Wanibuchi, Kitamoto (JP); Koichi Arita, Hanyu (JP)

(73) Assignees: Nissin Kogyo Co., Ltd., Ueda-shi (JP); Fukoku Co., Ltd., Ageo-shi (JP)

( * ) Notice: Subject to any disclaimer, the term of this patent is extended or adjusted under 35 U.S.C. 154(b) by 0 days.

(21) Appl. No.: 10/824,368

(22) Filed: Apr. 15, 2004

(65) Prior Publication Data

US 2004/0256187 A1    Dec. 23, 2004

(30) Foreign Application Priority Data

Apr. 16, 2003    (JP)    ............... 2003-111554

(51) Int. Cl.
*F16D 55/18*    (2006.01)
*F16J 15/16*    (2006.01)

(52) U.S. Cl. ..................... 188/72.4; 277/650
(58) Field of Classification Search ............... 188/72.4, 188/370; 277/650, 627, 944; 524/496
See application file for complete search history.

(56) References Cited

U.S. PATENT DOCUMENTS

| | | | |
|---|---|---|---|
| 3,438,932 A * | 4/1969 | Sieron ..................... 524/433 |
| 3,562,195 A * | 2/1971 | Reiner et al. ............. 524/322 |
| 4,161,239 A * | 7/1979 | Karasudani ............. 188/106 P |
| 4,524,677 A * | 6/1985 | Ashman et al. ................ 92/168 |
| 4,858,516 A * | 8/1989 | Klein ........................... 92/240 |
| 5,076,593 A * | 12/1991 | Sullivan et al. ............. 277/565 |
| 5,252,659 A * | 10/1993 | Koizumi et al. ............ 924/496 |
| 5,260,111 A * | 11/1993 | Valaitis et al. ................ 428/57 |
| 5,728,766 A | 3/1998 | Schauder et al. |
| 6,046,806 A * | 4/2000 | Thompson ................... 356/246 |
| 6,274,665 B2 * | 8/2001 | Ono et al. ................... 524/493 |
| 6,642,291 B2 * | 11/2003 | Chino et al. ................. 524/196 |
| 6,784,255 B1 | 8/2004 | Nakahama et al. |
| 6,881,770 B2 * | 4/2005 | Mizuno et al. ................ 524/13 |
| 2005/0027060 A1 * | 2/2005 | Yagi et al. ................... 524/493 |
| 2005/0096424 A1 * | 5/2005 | Otsuji et al. ................. 524/496 |

FOREIGN PATENT DOCUMENTS

| | | | |
|---|---|---|---|
| EP | 1469240 | * | 10/2004 |
| GB | 2 119 874 A | | 11/1983 |
| GB | 1050021 A | * | 12/1996 |
| JP | A-1-108289 | | 4/1989 |
| JP | B2 3-59291 | | 9/1991 |
| JP | T-7-508770 | | 9/1995 |
| JP | A-2000-241736 | | 9/2000 |

(Continued)

*Primary Examiner*—Thomas Williams
(74) *Attorney, Agent, or Firm*—Oliff & Berridge, PLC

(57) ABSTRACT

A piston seal of a disc brake can stabilize the amount of rollback of a piston by reducing thermal expansion and a decrease in modulus of elasticity of the piston seal caused by an increase in temperature, thereby preventing a driver from feeling that the brake operation is unnatural. The piston seal is formed of a rubber composition in which at least 100 parts by weight or more of carbon black is added to 100 parts by weight of ethylene propylene rubber.

4 Claims, 2 Drawing Sheets

FOREIGN PATENT DOCUMENTS

| | | | |
|---|---|---|---|
| JP | 2002348424 A | * | 12/2002 |
| JP | 2003160692 A | * | 6/2003 |
| JP | 2003253067 A | * | 9/2003 |
| RO | 117023 B1 | * | 9/2001 |
| WO | WO 9207207 A1 | * | 4/1992 |
| WO | WO 01/07516 | | 2/2001 |

* cited by examiner

PISTON SEAL AND DISC BRAKE USING THE PISTON SEAL

Japanese Patent Application No. 2003-111554, filed on Apr. 16, 2003, is hereby incorporated by reference in its entirety.

BACKGROUND OF THE INVENTION

The present invention relates to a piston seal formed of a rubber composition, and a disc brake using the piston seal.

A piston seal is generally formed of a rubber composition containing rubber as an essential component. For example, a vehicular disc brake is equipped with a caliper body including a piston and a cylinder. A piston seal is provided in a ring-shaped groove formed in the inner circumferential surface of the cylinder. In the disc brake, brake pads are pressed against a disc rotor secured to each wheel by applying hydraulic pressure, and rotation of the wheel is stopped by friction force of the brake pads which are made of a friction material. The piston seal has a role of sealing brake fluid and a role of returning (rolling back) the piston which has been moved forward by applying hydraulic pressure. Applying hydraulic pressure moves forward the piston that has been inserted into a cylinder bore. This causes the brake pads to be pressed against the disc.

Specifically, the piston seal enables the cylinder and the piston inserted into the cylinder bore to fluid-tightly and movably come in contact with each other. The piston which has been moved forward by applying hydraulic pressure is rolled back by the piston seal (see Japanese Patent Publication No. H03-59291). Therefore, the piston seal is required to have toughness for securely sealing the brake fluid and elasticity for returning (rolling back) the piston which has been moved forward by applying hydraulic pressure.

The temperature of the caliper body of the disc brake increases during the operation due to frictional heat occurring between the disc rotor and the brake pads. Therefore, the piston seal is also subjected to high temperature. The piston seal formed of a rubber composition thermally expands at high temperature, and the modulus of elasticity of the piston seal decreases. In this case, the amount of rollback of the piston changes due to thermal expansion and a decrease in modulus of elasticity of the piston seal, whereby the allowance of the brake effects change. In a disc brake for a motorcycle, the amount of stroke of the brake lever changes, whereby the driver feels that the brake operation is unnatural.

BRIEF SUMMARY OF THE INVENTION

The present invention may provide a piston seal in which thermal expansion caused by an increase in temperature is reduced, and a disc brake using the piston seal. The present invention may further provide a piston seal in which a decrease in modulus of elasticity caused by an increase in temperature is reduced, and a disc brake using the piston seal.

A first aspect of the present invention relates to a piston seal which fluid-tightly and slidably maintains a piston in a cylinder bore, the piston sliding inside the cylinder bore, wherein the piston seal is formed of a rubber composition in which at least 100 parts by weight or more of carbon black is added to 100 parts by weight of ethylene propylene rubber.

According to the first aspect of the present invention, since the piston seal is formed of the rubber composition in which at least 100 parts by weight or more of carbon black is added to 100 parts by weight of ethylene propylene rubber, heat resistance, cold resistance, sealing properties, and resistance to fluid such as brake fluid can be obtained. Moreover, a decrease in sealing properties due to a change in temperature can be prevented by reducing thermal expansion of the piston seal caused by an increase in temperature. Furthermore, a high modulus of elasticity can be maintained not only at low temperature but also at high temperature by reducing a decrease in modulus of elasticity of the piston seal caused by an increase in temperature, whereby a decrease in sealing properties and followability can be prevented.

With this piston seal, the carbon black may have an average particle diameter of 40 nm to 500 nm.

According to this configuration, the coefficient of linear expansion of the rubber composition can be reduced by reducing the percentage of the rubber polymer in the rubber composition while providing hardness and mechanical strength required for the piston seal.

With this piston seal, the carbon black may have a nitrogen adsorption specific surface area of 70 $m^2$/g or less.

According to this configuration, the coefficient of linear expansion of the rubber composition can be reduced by reducing the percentage of the rubber polymer in the rubber composition while providing hardness and mechanical strength required for the piston seal.

With this piston seal, the rubber composition may have a coefficient of linear expansion of $1.6 \times 10^{-4}$ (/K) or less.

According to this configuration, thermal expansion of the piston seal caused by an increase in temperature can be reduced, whereby a decrease in sealing properties due to change in temperature can be prevented.

With this piston seal, the rubber composition may have a dynamic modulus of elasticity of 12 MPa or more both at 10 Hz and 30° C., and at 10 Hz and 150° C.

According to this configuration, a high modulus of elasticity can be maintained not only at low temperature but also at high temperature by reducing the decrease in modulus of elasticity of the piston seal caused by an increase in temperature, whereby a decrease in sealing properties and followability of the piston seal can be prevented. If the dynamic modulus of elasticity at 150° C. is less than 12 MPa, sealing properties and followability required for the piston seal at high temperature of 150° C. or more may not be obtained.

With this piston seal, the rubber composition may have a rate of change in dynamic modulus of elasticity caused by an increase in temperature from 30° C. to 150° C. within ±25%.

According to this configuration, the piston seal can maintain a stable modulus of elasticity not only at low temperature but also at high temperature, whereby a decrease in sealing properties and followability of the piston seal can be prevented.

This piston seal may be used for a caliper body for a disc brake.

According to this configuration, the piston seal can reproduce a stable amount of rollback over a temperature range from a low temperature region to a high temperature region.

A second aspect of the present invention relates to a disc brake including:

the piston seal as defined in the first aspect of the present invention;

a cylinder having a cylinder bore; and a piston which is inserted into the cylinder bore, wherein the piston seal is fitted into a ring-shaped groove formed in an inner surface of the cylinder bore, and wherein the piston inserted into the cylinder bore is fluid-tightly and movably in contact with the cylinder, and the piston that has been moved forward by applying hydraulic pressure is rolled back.

According to this configuration, thermal expansion of the piston seal of the disc brake caused by an increase in temperature can be reduced, and a decrease in modulus of elasticity can be prevented. Therefore, the amount of rollback of the piston can be stabilized, whereby driver's unnatural feeling with the brake operation can be reduced.

DETAILED DESCRIPTION OF THE EMBODIMENT

An embodiment of the present invention is described below in detail with reference-to the drawings.

Figure 1:
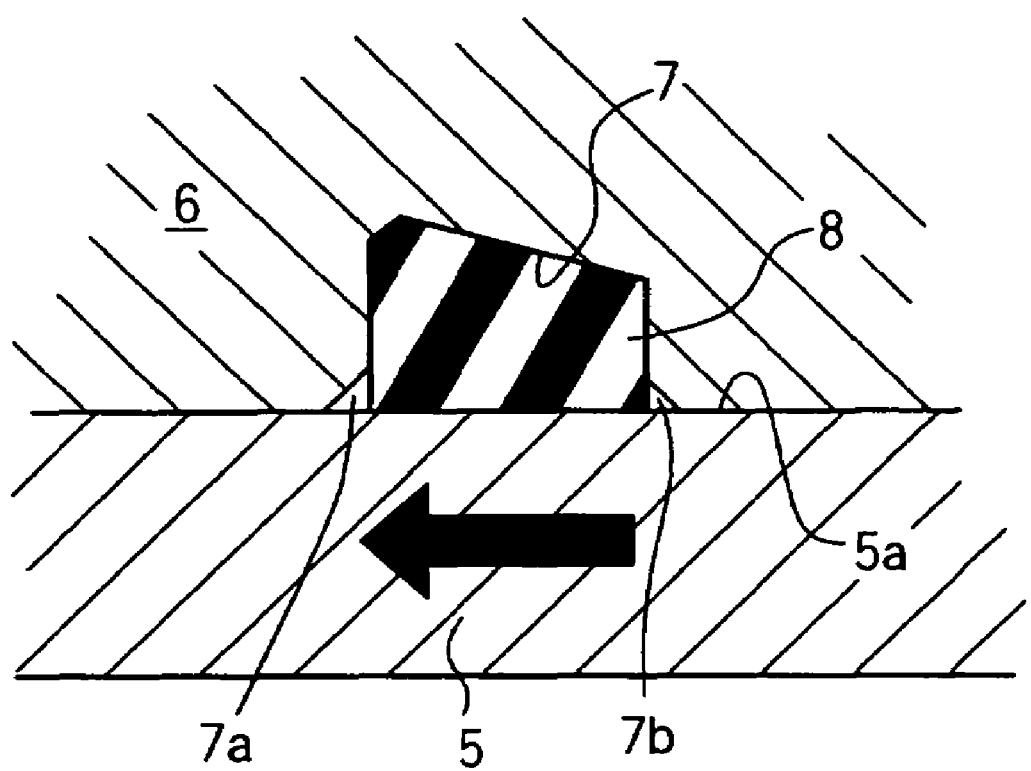
FIG. 1 is a cross-sectional view schematically showing a piston seal according to an embodiment of the present invention.
Figure 2:
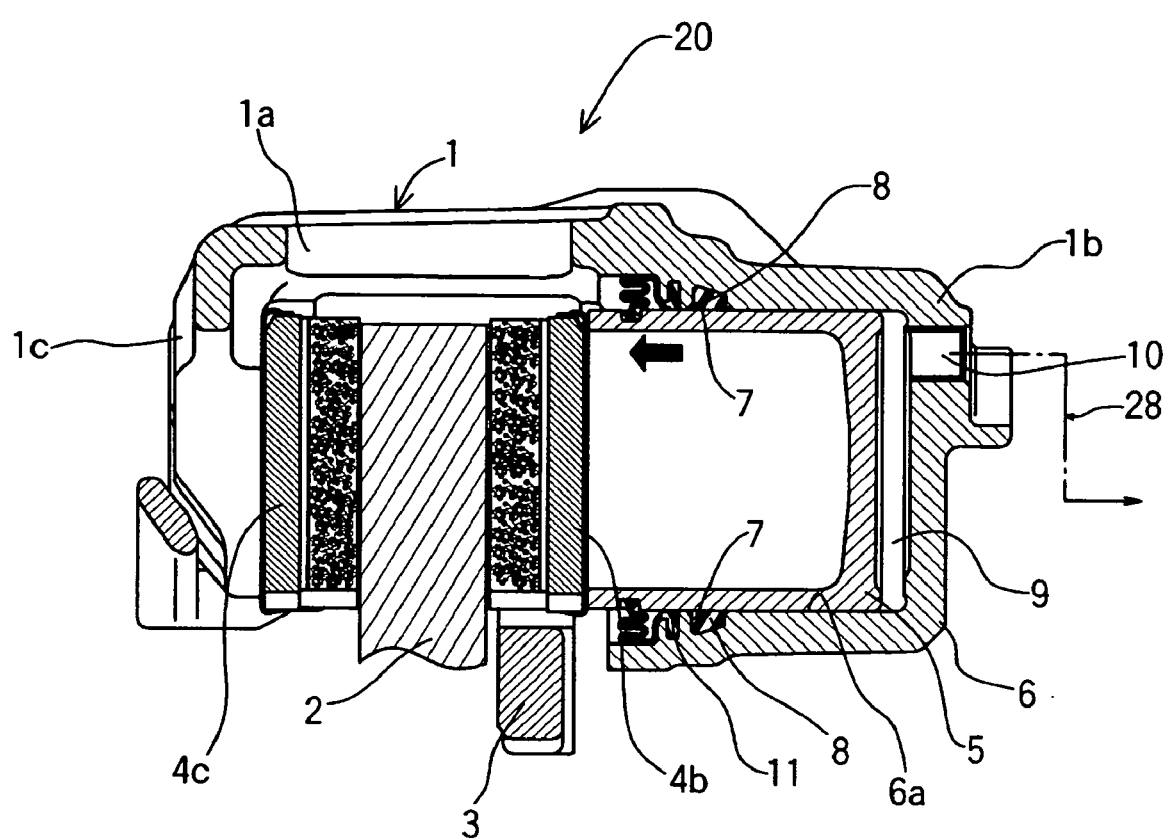
FIG. 2 is a cross-sectional view schematically showing a disc brake including the piston seal shown in FIG. 1.

FIG. 1 is a cross-sectional view schematically showing a piston seal 8 according to an embodiment of the present invention. FIG. 2 is a cross-sectional view schematically showing a disc brake 20 including the piston seal 8 shown in FIG. 1. In this embodiment, a floating type vehicular disc brake (see FIG. 2) is described as an example.

The disc brake 20 includes a caliper body 1 including a piston 5 and a cylinder 6. The caliper body 1 includes a working section 1b and a counter-working section 1c. The working section 1b and the counter-working section 1c are integrally formed with a bridge section 1a interposed therebetween.

A pair of friction pads 4b and 4c is disposed to face a friction surface on each side of a disc rotor 2 which rotates together with a wheel (not shown). The caliper body 1 which presses the friction pads 4b and 4c against the disc rotor 2 is movably coupled to a bracket 3 through a slide pin (not shown). The caliper body 1 is made up of the working section 1b disposed at the back of the friction pad 4b, the counter-working section 1c disposed at the back of the friction pad 4c, and the bridge section 1a for coupling the working section 1b and the counter-working section 1c by striding over the outside of the disc rotor 2.

The disc brake 20 is slidably supported by the bracket 3 secured to a vehicle body (not shown). As shown in FIG. 2, the piston 5 and the cylinder 6 are formed in the working section 1b.

The friction pad 4b moves by being pressed by the piston 5 inserted into a bore 5a in the cylinder 6, and comes in contact with the side surface of the disc rotor 2. The friction pad 4c moves by being pressed by the counter-working section 1c, and comes in contact with the other side surface of the disc rotor 2. The braking operation is performed by the above-described operation.

A ring-shaped piston seal groove 7 is formed in the inner surface of the cylinder bore 6a. The piston seal 8 is fitted into the piston seal groove 7. The material for the piston seal 8 is described later.

A hydraulic chamber 9 is formed between the bottom of the piston 5 and the cylinder 6. A brake fluid is supplied to the hydraulic chamber 9 from a supply port 10. The piston seal 8 has a function of sealing the brake fluid and a function of rolling back the piston 5 which has been moved forward when the hydraulic pressure decreases. The supply port 10 is connected with an output port (not shown) of a master cylinder (not shown), which is a hydraulic pressure source, through a hydraulic passage 28.

As shown in FIG. 1, the piston seal groove 7 has a chamfered corner 7a and a chamfered corner 7b. The piston 5 slides forward in the direction indicated by a black arrow shown in FIG. 1 (toward the disc rotor 2 in FIG. 2), and a part of the piston seal 8 enters the chamfered corner 7a while following the sliding surface of the piston 5. The piston seal 8 restores its shape due to elasticity when the hydraulic pressure in the hydraulic chamber 9 decreases, whereby the piston 5 is rolled back in the direction opposite to the direction indicated by the arrow.

The piston seal 8 is formed of a rubber composition in which 100 parts by weight or more of carbon black is added to 100 parts by weight of ethylene propylene rubber. If the amount of the carbon black is less than 100 parts by weight, the coefficient of linear expansion may not be reduced by reducing the percentage of the rubber polymer in the piston seal while providing hardness and mechanical strength required for the piston seal. The amount of the carbon black is still more preferably 120 to 250 parts by weight for 100 parts by weight of the ethylene propylene rubber. The unit "parts by weight" indicates "phr" unless otherwise stated. The term "phr" is the abbreviation for "parts per hundred of resin or rubber", and indicates the percentage weighting of additives or the like with respect to the rubber or the like.

Ethylene Propylene Rubber

As the ethylene propylene rubber (EPR), an ethylene-propylene-diene copolymer (EPDM), an ethylene-propylene copolymer (EPM), or the like may be used. In order to obtain heat resistance, cold resistance, and sealing properties required for the piston seal, the ethylene propylene rubber in this embodiment preferably includes a third component such as ethylidenenorbornene, and is preferably EPDM in which the copolymerization ratio of ethylene to propylene expressed by the ethylene content is 45% to 80%.

Carbon Black

The carbon black preferably has an average particle diameter of 40 nm to 500 nm, and still more preferably 50 nm to 500 nm in order to reduce the coefficient of linear expansion of the rubber composition by reducing the percentage of the rubber polymer in the rubber composition while providing hardness and mechanical strength required for the piston seal. If the average particle diameter of the carbon black is less than 40 nm, a desired combination of hardness and coefficient of linear expansion cannot be obtained. If the average particle diameter exceeds 500 nm, the reinforcement effect cannot be obtained. The size of the carbon black expressed by the nitrogen adsorption specific surface area ($m_2$/g) is preferably 70 $m^2$/g or less, and still more preferably 50 $m^2$/g or less in order to obtain a desired combination of hardness and coefficient of linear expansion. If the rubber composition contains carbon black having a nitrogen adsorption specific surface area of 70 $m^2$/g or less, the coefficient of linear expansion of the rubber composition can be reduced by reducing the percentage of the rubber polymer in the rubber composition while providing hardness and mechanical strength required for the piston seal.

Rubber Composition

As a method for obtaining the rubber composition of the present invention, a method of supplying 100 parts by weight of the ethylene propylene rubber and at least 100 parts by weight or more of the carbon black to a conventional mixer such as a mixing roll, a single screw or twin screw extruder, a Banbury mixer, or a kneader, and kneading the mixture can be given. Process oil is generally used during kneading in an amount approximately equal to the amount of the carbon black. However, it is preferable not to use the process oil in the manufacturing process of the rubber composition of the present invention. If a disc brake piston seal manufactured by using the process oil is used, the process oil dissolves in the brake fluid, thereby causing a change in performance with time or a change in heat resistance of the brake fluid to occur.

As a crosslinking agent to be added when kneading the rubber composition of the present invention, an organic peroxide such as 1,1-bis(tert-butylperoxy)-3,3,5-trimethylcyclohexane, 2,5-dimethyl-2,5-di(tert-butylperoxy)hexane, 2,5-dimethyl-2,5-di(tert-butylperoxy)hexin-3-tert-butylcumylperoxide, di(tert-butylperoxy)-m-diisopropylbenzene, di-tert-butylperoxide, 1,3-di(tert-butylperoxyisopropyl)benzene, or benzoylperoxide, and a co-crosslinking agent such as triallyl isocyanate, ethylene glycol dimethacrylate, trimethylolpropane trimethacrylate, triallyl cyanurate, quinonedioxime, sulfur compound, or 1,2-polybutadiene may be used.

The rubber composition of the present invention preferably has a coefficient of linear expansion of $1.6 \times 10^{-4}$ (/K) or less. If the coefficient of linear expansion of the rubber composition is $1.6 \times 10^{-4}$ (/K) or less, thermal expansion caused by an increase in temperature can be prevented, whereby a decrease in sealing properties of the piston seal due to a change in temperature can be prevented. The dynamic modulus of elasticity at 10 Hz and 30° C. and the dynamic modulus of elasticity at 10 Hz and 150° C. of the rubber composition are preferably 12 MPa or more, and still more preferably 14 MPa or more. A high modulus of elasticity can be maintained not only at low temperature but also at high temperature by reducing a decrease in modulus of elasticity of the rubber composition caused by an increase in temperature, whereby a decrease in sealing properties and followability of the piston seal can be prevented. If the dynamic modulus of elasticity at 150° C. is less than 12 MPa, sealing properties and hardness required for the piston seal cannot be obtained at a high temperature of 150° C. or more. The rate of change in dynamic modulus of elasticity of the rubber composition caused by an increase in temperature from 30° C. to 150° C. is preferably within ±25%. A piston seal using a rubber composition having a rate of change in dynamic modulus of elasticity within ±25% can maintain a stable modulus of elasticity in the practical temperature range, whereby a decrease in sealing properties and followability of the piston seal can be prevented.

The rubber composition obtained by kneading the ethylene propylene rubber and the carbon black is formed into piston seal 8 by extrusion or injection molding.

The present invention is described below in detail by examples. In the examples, the piston seal 8 formed by preparing the rubber composition was fitted into the ring-shaped piston seal groove 7 of the disc brake 20, and subjected to an evaluation test for the amount of rollback and an evaluation test for the amount of increase in lever stroke of an operating lever (not shown) which operates a master cylinder (not shown) to evaluate properties of the piston seal. In the measurement of the amount of rollback, the disc brake 20 was operated by applying hydraulic pressure of 0.9 MPa ten times to the disc brake 20 in a state in which the piston seal was set at 140° C. Then, the piston was held at a hydraulic pressure of 6.9 MPa for five seconds, and the moving amount of the piston when releasing the hydraulic pressure was measured. The amount of increase in lever stroke was measured by measuring the amount of stroke of a brake lever for a motorcycle before the brake started to work in a state in which the piston seal was set at 30° C. and 140° C.

The evaluation test results are shown in Table 1.

TABLE 1

| | Property | | Example 1 | Example 2 | Example 3 | Comparative Example 1 | Comparative Example 2 |
|---|---|---|---|---|---|---|---|
| Component | Ethylene propylene rubber (*1) | phr | 100 | 100 | 100 | 100 | 100 |
| | HAF carbon black | phr | — | — | — | 45 | 100 |
| | MT carbon black | phr | 100 | 130 | 150 | — | — |
| | Organic peroxide | phr | 2.5 | 2.5 | 4 | 2.5 | 2.5 |
| | Co-crosslinking agent | phr | 1 | 1 | 1 | 1 | 1 |
| Rubber property | Dynamic modulus of elasticity E' (30° C.) (*2) | MPa | 17 | 21 | 25 | 12 | 62 |
| | Dynamic modulus of elasticity E' (150° C.) (*3) | MPa | 14 | 16 | 19 | 9 | 35 |
| | E' change rate (*4) | % | −18 | −24 | −21 | −30 | −57 |
| | Coefficient of linear expansion ×10$^{-4}$ | /K | 1.58 | 1.49 | 1.16 | 1.89 | 1.56 |
| Brake performance | Amount of rollback | mm | 0.055 | 0.040 | 0.046 | 0.073 | — |
| | Amount of increase in lever stroke | mm | 14 | 10 | 3 | 29 | — |
| | Evaluation (15 or less = acceptable) | | Acceptable | Acceptable | Acceptable | Unacceptable | — |

(*1): EPDM (EP33 manufactured by JSR Corporation)
(*2): Dynamic modulus of elasticity at 10 Hz and 30° C.
(*3): Dynamic modulus of elasticity at 10 Hz and 150° C.
(*4): Rate of change in dynamic modulus of elasticity {E'(30° C.) − E'(150° C.)}/E'(30° C.) × 100 (%)

EXAMPLE 1

100 parts by weight of MT grade carbon black (average particle diameter: 72 nm, nitrogen adsorption specific surface area: 27 m$^2$/g), 2.5 parts by weight of an organic peroxide, and 1 part by weight of a co-crosslinking agent were kneaded with 100 parts by weight of EPDM manufactured by JSR corporation (trade name "EP33") to obtain a rubber composition. A piston seal was formed by injection-molding the rubber composition. The amount of rollback of the resulting piston seal was as small as 0.055 mm. The amount of increase in lever stroke was 14 mm, which was within the allowable range.

EXAMPLE 2

130 parts by weight of MT grade carbon black (average particle diameter: 72 nm, nitrogen adsorption specific surface area: 27 m$^2$/g), 2.5 parts by weight of an organic peroxide, and 1 part by weight of a co-crosslinking agent were kneaded with 100 parts by weight of ethylene propylene rubber to obtain a rubber composition. A piston seal was formed by injection-molding the rubber composition. The amount of rollback of the resulting piston seal was 0.040 mm, which was smaller than that in Example 1. The amount of increase in lever stroke was 10 mm, which was within the allowable range.

EXAMPLE 3

150 parts by weight of MT grade carbon black (average particle diameter: 72 nm, nitrogen adsorption specific surface area: 27 m$^2$/g), 4 parts by weight of an organic peroxide, and 1 part by weight of a co-crosslinking agent were kneaded with 100 parts by weight of ethylene propylene rubber to obtain a rubber composition. A piston seal was formed by injection-molding the rubber composition. The amount of rollback of the resulting piston seal was as small as 0.046 mm. The amount of increase in lever stroke was 3 mm, which was within the allowable range and was smaller than that in Example 2.

COMPARATIVE EXAMPLE 1

45 parts by weight of HAF grade carbon black (average particle diameter: 28 nm, nitrogen adsorption specific surface area: 79 m$^2$/g), 2.5 parts by weight of an organic peroxide, and 1 part by weight of a co-crosslinking agent were kneaded with 100 parts by weight of ethylene propylene rubber to obtain a rubber composition. A piston seal was formed by injection-molding the rubber composition. The amount of rollback of the resulting piston seal was as large as 0.073 mm. The amount of increase in lever stroke was 29 mm, which was outside the allowable range (15 mm or less).

COMPARATIVE EXAMPLE 2

100 parts by weight of HAF grade carbon black (average particle diameter: 28 nm, nitrogen adsorption specific surface area: 79 m$^2$/g) was kneaded with 100 parts by weight of ethylene propylene rubber to obtain a rubber composition. With this rubber composition, it was difficult to form a piston seal and the evaluation could not be made.

As shown in Table 1, in Examples 1 to 3, in which the rubber composition having a coefficient of linear expansion of 1.6×10$^{-4}$ (/K) or less was used, the amount of rollback and the amount of increase in lever stroke were evaluated as acceptable. This shows that the performance of the piston seal at high temperature (140° C.) does not significantly change in comparison with a case at low temperature (30° C.) since the piston seal expands to only a small extent even at the high temperature. In Comparative Example 1, since the coefficient of linear expansion exceeds 1.6×10$^{-4}$ (/K), the amount of rollback increased due to volume expansion of the piston seal at high temperature, and the amount of increase in lever stroke exceeded 15 mm. Therefore, the evaluation showed that the driver would feel that the brake operation is unnatural.

As is clear from Table 1, in the case of using the rubber compositions in Examples 1 to 3 which maintain a dynamic modulus of elasticity at 10 Hz and 30° C. and a dynamic modulus of elasticity at 10 Hz and 150° C. of 12 MPa or more, it was confirmed that a stable amount of rollback and amount of lever stroke can be maintained even at high temperature (150° C.). The E' change rate in Table 1 is the rate of change in dynamic modulus of elasticity caused by an increase in temperature from 30° C. to 150° C. The E' change rate of the rubber compositions of Examples 1 to 3 did not exceed ±25%. In the case of using the rubber composition of Comparative Example 1 of which the E' change rate exceeds −25%, the amount of rollback increased at high temperature (150° C.), and the amount of increase in lever stroke exceeded 15 mm. Therefore, the evaluation showed that the driver would feel that the brake operation is unnatural.

As is clear from the evaluation results shown in Table 1, it was found that the piston seal formed of a rubber composition in which 100 parts by weight or more carbon black is added to 100 parts by weight of ethylene propylene rubber excels in performance evaluation for the amount of rollback and the amount of increase in lever stroke.

The present invention is not limited to the above-described embodiment. Various modifications and variations are possible within the spirit and scope of the present invention.

This embodiment illustrates a piston seal included in a vehicular disc brake. However, the present invention may be applied to other piston seals. In particular, the present invention is useful for a piston seal used in the temperature range from a low temperature region such as room temperature (30° C.) to a high temperature region of 150° C., for example.

What is claimed is:

1. A piston seal used for a caliper body for a disc brake, wherein the piston seal fluid-tightly and slidably maintains a piston in a cylinder bore, the piston sliding inside the cylinder bore, and the piston is rolled back, wherein the piston seal is formed of an ethylene propylene rubber composition comprising at least 100 parts carbon black per hundred parts rubber, and
wherein the rubber composition has a dynamic modulus of elasticity of 12 MPa or more both at 10 Hz and 30° C., and at 10 Hz and 150° C.

2. A piston seal used for a caliper body for a disc brake, wherein the piston seal fluid-tightly and slidably maintains a piston in a cylinder bore, the piston sliding inside the cylinder bore, and the piston is rolled back, wherein the piston seal is formed of an ethylene propylene rubber composition comprising at least 100 parts carbon black per hundred parts rubber, and
wherein the rubber composition has a rate of change in dynamic modulus of elasticity caused by an increase in temperature from 30° C. to 150° C. within ±25%.

3. A disc brake comprising:
the piston seal and piston as defined in claim 1; and
a cylinder having a cylinder bore including a ring-shaped groove formed in an inner surface of the cylinder bore,
wherein the piston seal is fitted into the ring-shaped groove, and
wherein the piston, when inserted into the cylinder bore, is fluid-tightly and movably in contact with the cylinder, and the piston that has been moved forward by applying hydraulic pressure is rolled back.

4. A disc brake comprising:
the piston seal and piston as defined in claim 2; and
a cylinder having a cylinder bore including a ring-shaped groove formed in an inner surface of the cylinder bore, wherein the piston seal is fitted into the ring-shaped groove, and wherein the piston, when inserted into the cylinder bore, is fluid-tightly and movably in contact with the cylinder, and the piston that has been moved forward by applying hydraulic pressure is rolled back.

* * * * *